(12) United States Patent
Ku et al.

(10) Patent No.: US 9,246,399 B2
(45) Date of Patent: Jan. 26, 2016

(54) POWER SUPPLY SYSTEM AND CONTROL METHOD THEREOF

(71) Applicant: DELTA ELECTRONICS, INC., Taoyuan Hsien (TW)

(72) Inventors: Chung-Ping Ku, Taoyuan Hsien (TW); Yi-Hsin Leu, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 473 days.

(21) Appl. No.: 13/846,610

(22) Filed: Mar. 18, 2013

(65) Prior Publication Data

US 2014/0203651 A1 Jul. 24, 2014

(30) Foreign Application Priority Data

Jan. 18, 2013 (TW) .............................. 102102019 A (51) Int. Cl.
*H02J 1/00* (2006.01)
*H02J 3/00* (2006.01)
*H02M 7/00* (2006.01)
*H02J 1/10* (2006.01)
*H02M 1/42* (2007.01)
*H02M 7/23* (2006.01)

(52) U.S. Cl.
CPC ................ *H02M 7/00* (2013.01); *H02J 1/102* (2013.01); *H02M 1/4225* (2013.01); *H02J 2001/008* (2013.01); *H02M 7/23* (2013.01); *Y10T 307/696* (2015.04)

(58) Field of Classification Search
CPC ......................................................... H02J 1/00
USPC ............................................................ 307/80
See application file for complete search history.

(56) References Cited

U.S. PATENT DOCUMENTS

2011/0310646 A1* 12/2011 Humphrey .......... H02M 3/1584
363/126

FOREIGN PATENT DOCUMENTS

TW 201207409 2/2012

* cited by examiner

*Primary Examiner* — Rexford Barnie
*Assistant Examiner* — Toan Vu
(74) *Attorney, Agent, or Firm* — Kirton McConkie; Evan R. Witt (57) ABSTRACT

A power supply system includes a first power module for outputting a first voltage and a second power module for outputting a second voltage. The first power module includes a first switch element, and a second switch element. The second power module includes a third switch element, and a fourth switch element. When the first power module is in a working state and the second power module is then plugged into the power supply system in a hot-swappable manner, only if a phase difference or a voltage difference between the first power source and the second power source is lower than a threshold value, the second switch element and the fourth switch element are controlled to be turned on. Subsequently, if the second voltage is higher than the first voltage, the third switch element is controlled to be turned on.

14 Claims, 6 Drawing Sheets

FIG. 1

$SW_1 \sim SW_4$

POWER SUPPLY SYSTEM AND CONTROL METHOD THEREOF

FIELD OF THE INVENTION

The present invention relates to a power supply system and a control method thereof, and more particularly to a power supply system and a control method for avoiding generation of an unexpected returning current path and an inrush current.

BACKGROUND OF THE INVENTION

As known, a power factor correction (PFC) circuit is widely used in a power supply system of an electronic apparatus for filtering off the harmonic wave component contained in the received current, thereby increasing the power factor. Consequently, the power supply system comprises a power module with a power factor correction circuit. By the power factor correction circuit, the distribution of the AC input current provided by the utility power source is no longer too centralized, the magnitude of the harmonic wave is reduced, and the power loss of the power supply system is reduced.

As the demands on the power level and the backup function of the electronic apparatus are gradually increased, the power supply system is usually equipped with two or more power modules. Conventionally, each of the power modules comprises a power factor correction circuit and a DC-to-DC converter. The output sides of the DC-to-DC converters of these power modules are connected with each other in parallel and further electrically connected with a main circuit of the electronic apparatus. Moreover, for providing sufficient electric energy to the electronic apparatus, each power module may be removed from or plugged into the power supply system during the electronic apparatus is in the normal working state. In other words, the plural power modules of the power supply system are hot-swappable to be plugged into the power supply system.

However, when the plural power modules are plugged into the power supply system in a hot-swappable manner to be connected with each other in parallel, two problems may occur. For example, when plural power sources provide electric energy to the plural power modules, if the phases of different power sources are different or there is a voltage difference between the plural power modules, the output current from the working power module will flow into a specified power module which is being plugged into the power supply system in the hot-swappable manner. Under this circumstance, an unexpected returning current path is generated in the swapping power module. Due to the unexpected returning current path, the filtering efficacy of an EMI filter of the swapping power module is deteriorated, and the pre-charged voltage across an output capacitor of the swapping power module is too high.

Moreover, when a specified power module is plugged into the power supply system in the hot-swappable manner to be connected with the working power module in parallel, since the voltage across the output capacitor of the swapping power module is zero at the moment of plugging the swapping power module into the power supply system, the output voltage from the working power module of the power supply system will charge the output capacitor of the swapping power module. Under this circumstance, the output capacitor of the swapping power module is readily subjected to a large dv/dt change, and thus an inrush current is generated by the output capacitor. Due to the inrush current, the power module may be damaged.

For solving the above drawbacks, the power supply system may be equipped with an isolation transformer. The isolation transformer comprises plural primary windings and a secondary winding. The plural primary windings are electrically connected with the output sides of the corresponding power modules. The secondary winding is electrically connected with the main circuit of the electronic apparatus. By the isolation transformer, the plural power modules are isolated from each other. Consequently, when any power module is plugged into the power supply system in the hot-swappable manner, the possibility of generating the unexpected returning current path and the inrush current will be reduced. However, since the isolation transformer is bulky, the overall volume of the power supply system fails to be effectively reduced. Moreover, since the power supply system has the additional isolation transformer to transmit electric energy, the use of the isolation transformer may result in undesired power loss. Under this circumstance, the efficiency of the power supply system is impaired.

Therefore, there is a need of providing a power supply system and a control method thereof in order to eliminate the above drawbacks.

SUMMARY OF THE INVENTION

The present invention provides a power supply system and a control method in order to avoid the generation of an unexpected returning current path and an inrush current.

In accordance with an aspect of the present invention, there is provided a power supply system. The power supply system includes a first power module and a second power module. The first power module is swappable to be plugged into the power supply system for converting electric energy of a first power source into a first voltage and outputting the first voltage from a first positive output terminal and a first negative output terminal. The first power module includes a first power converting circuit for outputting the first voltage, a first switch element electrically connected between the first power converting circuit and the first positive output terminal, and a second switch element electrically connected between the first power converting circuit and the first negative output terminal and electrically connected with a ground terminal. The second power module is swappable to be plugged into the power supply system for converting electric energy of a second power source into a second voltage and outputting the second voltage from a second positive output terminal and a second negative output terminal. The second positive output terminal is electrically connected with the first positive output terminal, and the second negative output terminal is electrically connected with the first negative output terminal and the ground terminal. The second power module includes a second power converting circuit for outputting the second voltage, a third switch element electrically connected between the second power converting circuit and the second positive output terminal, and a fourth switch element electrically connected between the second power converting circuit and the second negative output terminal. The first power source and the second power source are electrically connected with each other through a center line. When the first power module is in a working state in the power supply system and the second power module is then plugged into the power supply system in a hot-swappable manner, only if a phase difference or a voltage difference between the first power source and the second power source is lower than a threshold value, the second switch element and the fourth switch element are controlled to be turned on. After the second switch element and the fourth switch element are turned on, if the second voltage is higher than the first voltage, the third switch element is controlled to be turned on.

In accordance with another aspect of the present invention, there is provided a control method for a power supply system. The power supply system includes a first power module and a second power module. The first power module is swappable to be plugged into the power supply system for converting electric energy of a first power source into a first voltage and outputting the first voltage from a first positive output terminal and a first negative output terminal. The first power module includes a first power converting circuit for outputting the first voltage, a first switch element electrically connected between the first power converting circuit and the first positive output terminal and a second switch element electrically connected between the first power converting circuit and the first negative output terminal and electrically connected with a ground terminal. The second power module is swappable to be plugged into the power supply system for converting electric energy of a second power source into a second voltage and outputting the second voltage from a second positive output terminal and a second negative output terminal. The second positive output terminal is electrically connected with the first positive output terminal, and the second negative output terminal is electrically connected with the first negative output terminal and the ground terminal. The second power module includes a second power converting circuit for outputting the second voltage, a third switch element electrically connected between the second power converting circuit and the second positive output terminal, and a fourth switch element electrically connected between the second power converting circuit and the second negative output terminal. The first power source and the second power source are electrically connected with each other through a center line. The control method includes the following steps. When the first power module is in a working state in the power supply system and the second power module is then plugged into the power supply system in a hot-swappable manner, a judging step is performed to judge whether a phase difference or a voltage difference between the first power source and the second power source is lower than a threshold value. If the phase difference or the voltage difference between the first power source and the second power source is lower than the threshold value, the second switch element and the fourth switch element are controlled to be turned on. Then, another judging step is performed to judge whether the second voltage is larger than the first voltage. If the second voltage is larger than the first voltage, the third switch element is controlled to be turned on.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
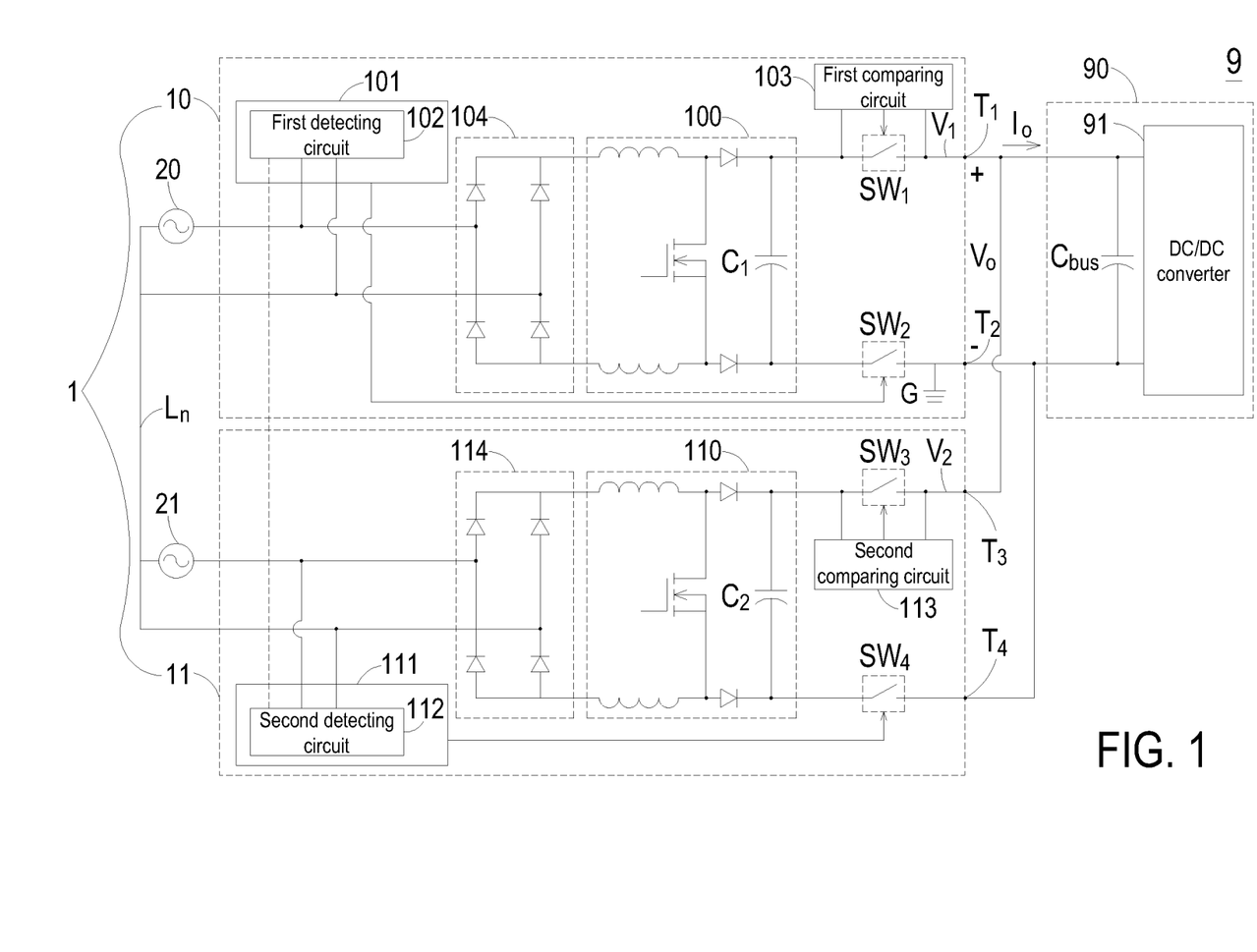
FIG. 1 is a schematic circuit diagram illustrating an electronic apparatus comprising a power supply system according to an embodiment of the present invention.

FIG. 1 is a schematic circuit diagram illustrating an electronic apparatus comprising a power supply system according to an embodiment of the present invention. As shown in FIG. 1, the power supply system 1 is installed in the electronic apparatus 9. Moreover, the power supply system 1 is electrically connected with a main circuit 90 of the electronic apparatus 9. The power supply system 1 is used for outputting a main output voltage $V_o$ (e.g. a DC voltage) and a main output current $I_o$ to the main circuit 90 for driving the main circuit 90. In this embodiment, the main circuit 90 comprises a bus capacitor $C_{bus}$ and a DC/DC converter 91. The two ends of the bus capacitor $C_{bus}$ are connected with the input terminals of the main circuit 90 for filtering the main output voltage $V_o$. The DC/DC converter 91 is electrically connected with the bus capacitor $C_{bus}$ for converting the filtered main output voltage $V_o$ into a regulated DC voltage (not shown) with another voltage level.

The power supply system 1 comprises plural hot-swappable power modules, which are connected with each other in parallel. These power modules are electrically powered by different power sources. For clarification and brevity, two power modules are illustrated in the drawings. In this embodiment, the power supply system 1 comprises a first power module 10 and a second power module 11.

The first power module 10 is swappable to be plugged into the power supply system 1. The input terminal of the first power module 10 is electrically connected with a first power source 20. The first power module 10 is used for converting the electric energy of the first power source 20 into a first voltage $V_1$. The first power module 10 further comprises a first positive output terminal $T_1$, a first negative output terminal $T_2$, a first power converting circuit 100, a first switch element $SW_1$, and a second switch element $SW_2$. The first positive output terminal $T_1$ and the first negative output terminal $T_2$ are electrically connected with the input terminals of the main circuit 90, respectively. Consequently, the first voltage $V_1$ is transmitted from the first power module 10 to the main circuit 90 through the first positive output terminal $T_1$ and the first negative output terminal $T_2$. Preferably, the first power converting circuit 100 is a first power factor correction circuit, and the first power converting circuit 100 is used for correcting the power factor, and converting the electric energy from the first power source 20 into the first voltage $V_1$. The first switch element $SW_1$ is serially connected between the first power converting circuit 100 and the first positive output terminal $T_1$. The second switch element $SW_2$ is serially connected between the first power converting circuit 100 and the first negative output terminal $T_2$. Moreover, the second switch element $SW_2$ and the first negative output terminal $T_2$ are electrically connected with a ground terminal G.

Similarly, the second power module 11 is swappable to be plugged into the power supply system 1. The input terminal of the second power module 11 is electrically connected with a second power source 21. The second power module 11 is used for converting the electric energy of the second power source 21 into a second voltage $V_2$. The second power source 21 further comprises a second positive output terminal $T_3$, a second negative output terminal $T_4$, a second power converting circuit 110, a third switch element $SW_3$, and a fourth switch element $SW_4$. The second positive output terminal $T_3$ and the second negative output terminal $T_4$ are electrically connected with the input terminals of the main circuit 90, respectively. Consequently, the second voltage $V_2$ is transmitted from the second power module 11 to the main circuit 90 through the second positive output terminal $T_3$ and the second negative output terminal $T_4$. Moreover, the second positive output terminal $T_3$ is also electrically connected with the first positive output terminal $T_1$, and the second negative output terminal $T_4$ is also electrically connected with the first negative output terminal $T_2$. Consequently, the output sides of the first power module 10 and the second power module 11 are connected with each other in parallel. Preferably, the second power converting circuit 110 is a second power factor correction circuit, and the second power converting circuit 110 is used for correcting the power factor, and converting the electric energy from the second power source 21 into the second voltage $V_2$. The third switch element $SW_3$ is serially connected between the second power converting circuit 110 and the second positive output terminal $T_3$. The fourth switch element $SW_4$ is serially connected between the second power converting circuit 110 and the second negative output terminal $T_4$. Moreover, the fourth switch element $SW_4$ and the second negative output terminal $T_4$ are also electrically connected with the ground terminal G. Since the first negative output terminal $T_2$ and the second negative output terminal $T_4$ are electrically connected with the ground terminal G, the voltage at the first positive output terminal $T_1$ is equal to the first voltage $V_1$, and the voltage at the second positive output terminal $T_3$ is equal to the second voltage $V_2$.

Moreover, the first power source 20 and the second power source 21 are electrically connected with each other through a center line $L_n$. The first power source 20 and the second power source 21 may be two phases of a multi-phase power source, respectively. Moreover, the first power source 20 and the second power source 21 are used for providing AC voltages. Moreover, the first power converting circuit 100 further comprises a first output capacitor $C_1$. The two ends of the first output capacitor $C_1$ are connected with the output side of the first power converting circuit 100. The second power converting circuit 110 further comprises a second output capacitor $C_2$. The two ends of the second output capacitor $C_2$ are connected with the output side of the second power converting circuit 110.

Hereinafter, the operations of the power supply system 1 will be illustrated with reference to FIG. 1. In a case where only the first power module 10 is included in the power supply system 1 but the second power module 11 is removed from the power supply system 1, the first power module 10 of the power supply system 1 is in the working state to receive the electric energy from the first power source 20. In addition, the first switch element $SW_1$ and the second switch element $SW_2$ are turned on. Consequently, the electric energy from the first power source 20 is converted into the first voltage $V_1$ by the first power converting circuit 100 of the first power module 10. The electric energy of the first voltage $V_1$ is transmitted to the main circuit 90 through the first switch element $SW_1$, the second switch element $SW_2$, the first positive output terminal $T_1$ and the first negative output terminal $T_2$.

When the first power module 10 of the power supply system 1 is in the working state, if the second power module 11 is plugged into the power supply system 1 in a hot-swappable manner, the second positive output terminal $T_3$ is electrically connected with the first positive output terminal $T_1$, and the second negative output terminal $T_4$ is electrically connected with the first negative output terminal $T_2$. Consequently, the output sides of the first power module 10 and the second power module 11 are connected with each other in parallel, and the second power module 11 is electrically connected with the second power source 21 to receive the electric energy from the first power module 10. In accordance with a feature of the present invention, only if the phase difference or voltage difference between the first power source 20 and the second power source 21 is lower than a threshold value, the second switch element $SW_2$ and the fourth switch element $SW_4$ are controlled to be turned on. Generally, if the phase difference or voltage difference between the first power source 20 and the second power source 21 is higher than the threshold value and no measure is taken, the output current (not shown) from the first power module 10 may flow into the swapping power module (i.e. the second power module 11) because the first negative output terminal $T_2$ of the first power module 10 and the second negative output terminal $T_4$ of the second power module 11 are electrically connected with the ground terminal G. However, since the phase difference or voltage difference between the first power source 20 and the second power source 21 is higher than the threshold value, the second switch element $SW_2$ and the fourth switch element $SW_4$ are controlled to be turned off according to the settings of the present invention. Under this circumstance, the output current from the first power module 10 fails to flow into the second power module 11 through the first negative output terminal $T_2$. In other words, when the second power module 11 is plugged into the power supply system 1 in the hot-swappable manner to be connected with the first power module 10 in parallel, the possibility of generating an unexpected returning current path in the second power module 11 will be minimized or eliminated. Under this circumstance, the filtering efficacy of an EMI filter (not shown) of the second power module 11 can be maintained, and the pre-charged voltage across the second output capacitor $C_2$ of the second power converting circuit 110 of the second power module 11 will not be too high.

As mentioned above, if the phase difference or voltage difference between the first power source 20 and the second power source 21 is lower than a threshold value, the second switch element $SW_2$ and the fourth switch element $SW_4$ are controlled to be turned on. After the second switch element $SW_2$ and the fourth switch element $SW_4$ are turned on, if the voltage at the node between the third switch element $SW_3$ and the second power converting circuit 110 (i.e. the second voltage $V_2$ outputted from the second power converting circuit 110) is continuously controlled to be larger than the voltage at the node between the third switch element $SW_3$ and the second positive output terminal $T_3$ (i.e. the first voltage $V_1$ which is transmitted through the on-state first switch element $SW_1$ and outputted from the first positive output terminal $T_1$ of the first power module 10), the third switch element $SW_3$ is controlled to be turned on. That is, when the second power module 11 is plugged into the power supply system 1 in the hot-swappable manner to be connected with the first power module 10 in parallel, if the electric energy provided by the second power source 21 is insufficient to increase the second voltage $V_2$ to be higher than the first voltage $V_1$, the third switch element $SW_3$ is controlled to be turned off. Consequently, since the second output capacitor $C_2$ is not influenced by the first voltage $V_1$ from the first power module 10, the second output capacitor $C_2$ is not subjected to a large dv/dt change, and the problem of generating the inrush current will be avoided. On the other hand, as the second output capacitor $C_2$ is continuously charged by the electric energy from the second power source 21, the magnitude of the second voltage $V_2$ will be higher than the magnitude of the first voltage $V_1$. Under this circumstance, the third switch element $SW_3$ is controlled to be turned on. Consequently, the second voltage $V_2$ from the second power module 11 is transmitted to the main circuit 90.

Please refer to FIG. 1 again. The first power module 10 further comprises a first controlling unit 101. The first controlling unit 101 is electrically connected with the first power source 20 and the control terminal of the second switch element $SW_2$. Moreover, the first controlling unit 101 comprises a first detecting circuit 102 for detecting the phase or the voltage of the first power source 20. The second power module 11 further comprises a second controlling unit 111. The second controlling unit 111 is electrically connected with the second power source 21 and the fourth switch element $SW_4$. The second controlling unit 111 comprises a second detecting circuit 112 for detecting the phase or the voltage of the second power source 21. The second detecting circuit 112 is in communication with the first detecting circuit 102. Consequently, the detecting result of the first detecting circuit 102 can be realized by the second controlling unit 111, and the second detecting circuit 112 can be realized by the first controlling unit 101. According to the detecting results, the first controlling unit 101 can realize whether the phase difference or voltage difference between the first power source 20 and the second power source 21 is lower than the threshold value, thereby issuing a corresponding control signal (not shown). According to the control signal, the second switch element $SW_2$ is correspondingly turned on or turned off. Similarly, according to the detecting results, the second controlling unit 111 can realize whether the phase difference or voltage difference between the first power source 20 and the second power source 21 is lower than the threshold value, thereby issuing a corresponding control signal (not shown). According to the control signal, the fourth switch element $SW_4$ is correspondingly turned on or turned off. Consequently, during the first power module 10 or the second power module 11 is plugged into the power supply system 1 in the hot-swappable manner, the possibility of generating an unexpected returning current path in the first power module 10 or the second power module 11 is minimized or eliminated.

Please refer to FIG. 1 again. The first power module 10 further comprises a first comparing circuit 103. The first comparing circuit 103 is connected with the two ends of the first switch element $SW_1$ and electrically connected with the control terminal of the first switch element $SW_1$. The first comparing circuit 103 is used for comparing whether the voltage at the node between the first switch element $SW_1$ and the first power converting circuit 100 (i.e. the first voltage $V_1$ outputted from the first power converting circuit 100) is larger than the voltage at the node between the first switch element $SW_1$ and the first positive output terminal $T_1$ (i.e. the second voltage $V_2$ which is transmitted through the on-state third switch element $SW_3$ and outputted from the first positive output terminal $T_1$ of the first power module 10) in order to control the operation of the first switch element $SW_1$. The second power module 11 further comprises a second comparing circuit 113. The second comparing circuit 113 is connected with the two ends of the third switch element $SW_3$ and electrically connected with the control terminal of the third switch element $SW_3$. The second comparing circuit 113 is used for comparing whether the voltage at the node between the third switch element $SW_3$ and the second power converting circuit 110 (i.e. the second voltage $V_2$ outputted from the second power converting circuit 110) is larger than the voltage at the node between the third switch element $SW_3$ and the second positive output terminal $T_3$ (i.e. the first voltage $V_1$ which is transmitted through the on-state first switch element $SW_1$ and outputted from the first positive output terminal $T_1$ of the first power module 10) in order to control the operation of the third switch element $SW_3$.

In some other embodiments, the first power module 10 further comprises a first rectifying circuit 104. The first rectifying circuit 104 is electrically connected between the input terminal of the first power module 10 and the first power converting circuit 100 for rectification. Similarly, the second power module 11 further comprises a second rectifying circuit 114. The second rectifying circuit 114 is electrically connected between the input terminal of the second power module 11 and the second power converting circuit 110 for rectification.

Alternatively, in some other embodiments, each of the first power module 10 and the second power module 11 may be implemented in a circuit topology without power factor correction function.

Figure 2:
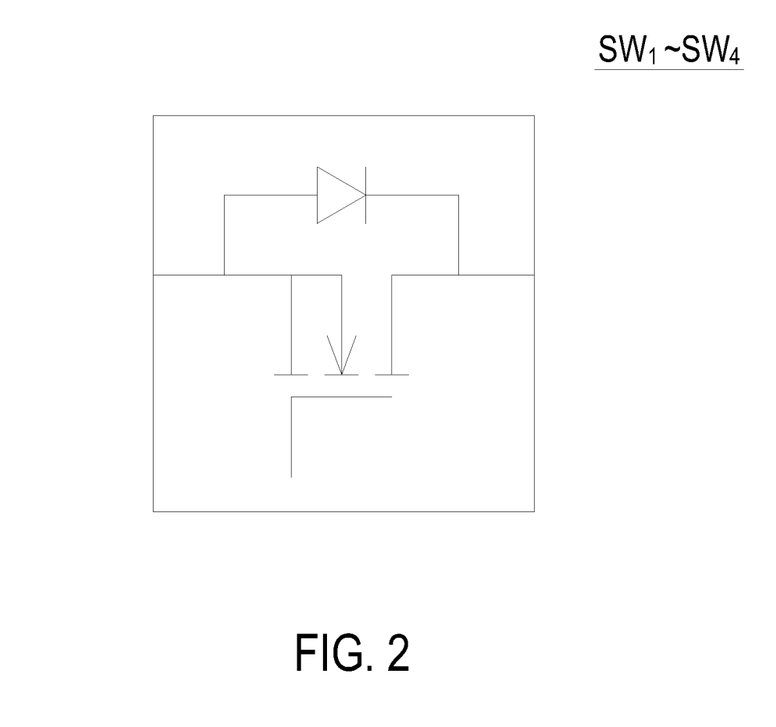
FIGS. 2, 3 and 4 schematically illustrate some possible examples of the first switch element, the second switch element, the third switch element and the fourth switch element of the power supply system of FIG. 1.
Figure 3:
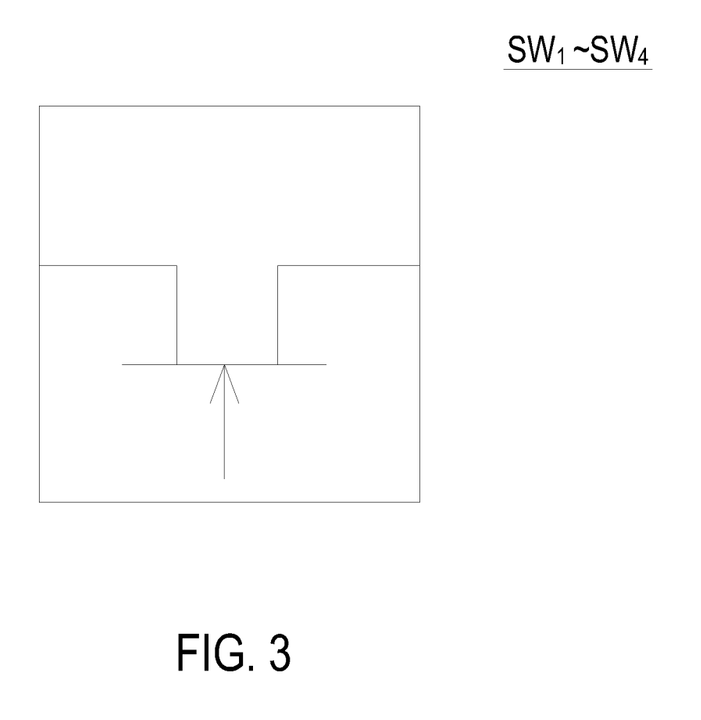
Figure 4:
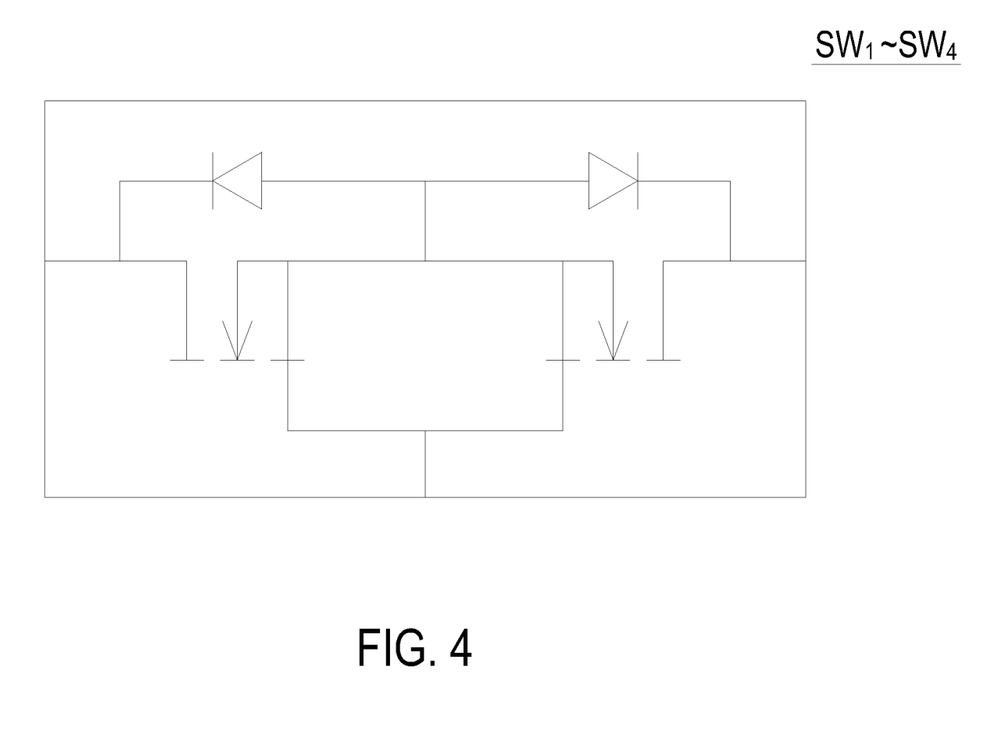

FIGS. 2, 3 and 4 schematically illustrate some possible examples of the first switch element, the second switch element, the third switch element and the fourth switch element of the power supply system of FIG. 1. Each of the first switch element $SW_1$, the second switch element $SW_2$, the third switch element $SW_3$ and the fourth switch element $SW_4$ includes but is not limited to a n-type power MOSFET (see FIG. 2), a power JFET (see FIG. 3) or a back-to-back n-type power MOSFET.

Figure 5:
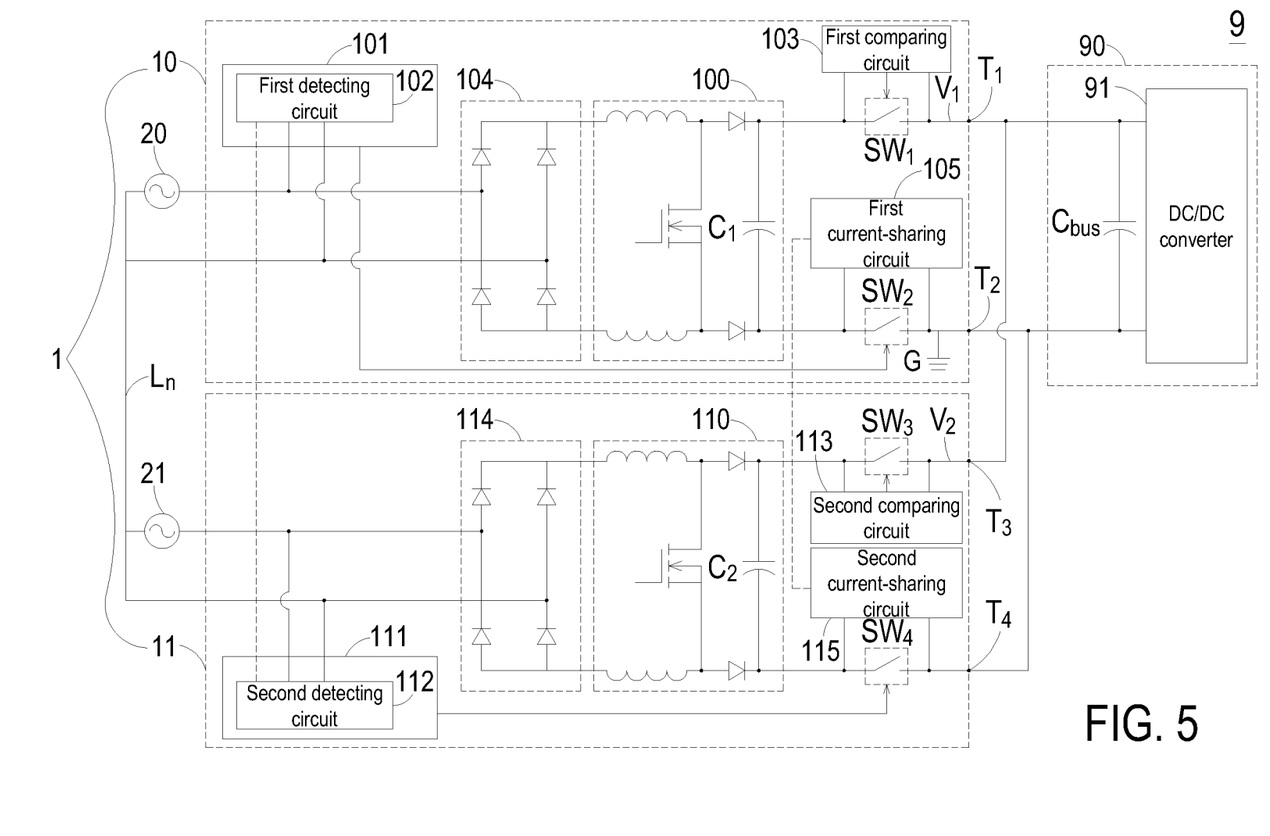
FIG. 5 is a schematic circuit diagram illustrating an electronic apparatus comprising a power supply system according to another embodiment of the present invention.

FIG. 5 is a schematic circuit diagram illustrating an electronic apparatus comprising a power supply system according to another embodiment of the present invention. For balancing the output current from the first power module 10 and the output current from the second power module 11, as shown in FIG. 5, the first power module 10 further comprises a first current-sharing circuit 105 and the second power module 11 further comprises a second current-sharing circuit 115. The two ends of the first current-sharing circuit 105 are electrically connected to the two ends of the second switch element $SW_2$, and the two ends of the second current-sharing circuit 115 are electrically connected to the two ends of the fourth switch element $SW_4$. Moreover, the first current-sharing circuit 105 and the second current-sharing circuit 115 are in communication with each other. The first current-sharing circuit 105 and the second current-sharing circuit 115 are used for detecting the currents flowing through the second switch element $SW_2$ and the fourth switch element $SW_4$, respectively. According to the detecting results, the output current from the first power module 10 and the output current from the second power module 11 are correspondingly adjusted. Consequently, the first power module 10 and the output current from the second power module 11 are equal.

Figure 6:
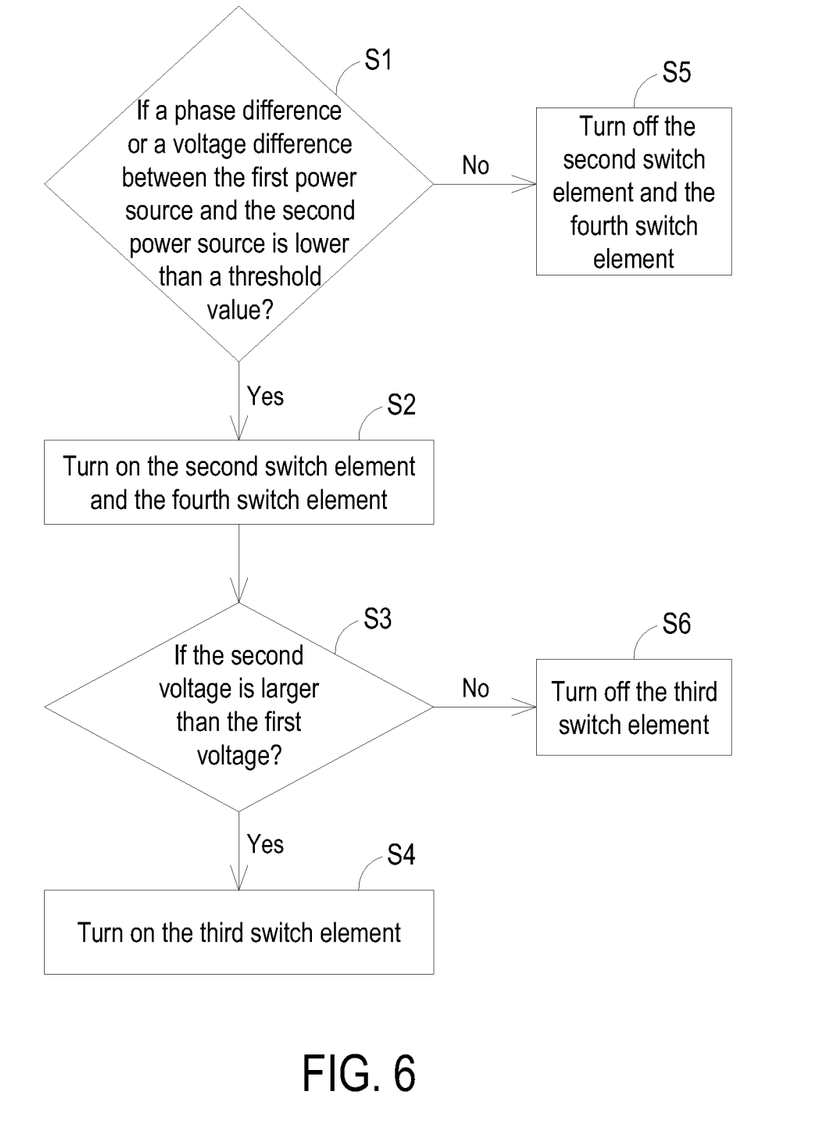
FIG. 6 is a schematic flowchart illustrating a control method for the power supply system according to the embodiment of the present invention.

FIG. 6 is a schematic flowchart illustrating a control method for the power supply system according to the embodiment of the present invention. Please refer to FIGS. 6 and 1. Firstly, in the step S1, when the first power module 10 is in the working state in the power supply system 1 and the second power module 11 is then plugged into the power supply system 1 in a hot-swappable manner, the first power module 10 and the second power module 11 judge whether a phase difference or a voltage difference between the first power source 20 and the second power source 21 is lower than a threshold value. If the judging condition of the step S1 is satisfied, the second switch element $SW_2$ and the fourth switch element $SW_4$ are controlled to be turned on (Step S2). Whereas, if the judging condition of the step S1 is not satisfied, the second switch element $SW_2$ and the fourth switch element $SW_4$ are controlled to be turned off (Step S5).

After the step S2, the step S3 is performed to judge whether the second voltage $V_2$ is larger than the first voltage $V_1$. If the judging condition of the step S3 is satisfied, the third switch element $SW_3$ is controlled to be turned on (Step S4). Whereas, if the judging condition of the step S3 is not satisfied, the third switch element $SW_3$ is controlled to be turned off (Step S6). Moreover, in the step S1, the first switch element $SW_1$ is controlled to be continuously turned on.

From the above descriptions, the present invention provides a power supply system and a control method for the power supply system. The power supply system comprises plural hot-swappable power modules, which are connected with each other in parallel. Each power module has a positive output terminal connected to a switch element and a negative output terminal connected to another switch element. When a specified power module is plugged into the power supply system to be connected with a working power module in parallel in a hot-swappable manner, only if the phase difference or the voltage difference between the specified power source and the working power source is lower than the threshold value, the switch elements electrically connected with the negative output terminals of all switch elements are turned on. After the switch elements electrically connected with the negative output terminals of all switch elements are turned on, if the voltage outputted from the working power module is larger than the voltage outputted from the specified power module which is being plugged into the power supply system in a hot-swappable manner, the switch element connected with the positive output terminal of the specified power module which is being plugged into the power supply system in a hot-swappable manner will be controlled to be turned on. Consequently, when a specified power module is plugged into the power supply system in the hot-swappable manner to be connected with the working power module in parallel, the possibility of generating the unexpected returning current path and the inrush current will be minimized without the need of installing an additional isolation transformer. Since no isolation transformer is included, the overall volume of the power supply system can be effectively reduced. Under this circumstance, the efficiency of the power supply system is enhanced. Furthermore, in the conventional power supply system, each of the power modules comprises a power factor correction circuit and a DC-to-DC converter, and the output sides of the DC-to-DC converters of these power modules are connected with each other in parallel and further electrically connected with a main circuit of the electronic apparatus. However, in the power supply system of the present invention, each of the power modules comprises a power converting circuit (for example a power factor correction circuit), and the output sides of the power converting circuit of these power modules are connected with each other in parallel and further electrically connected with a DC/DC converter of a main circuit of the electronic apparatus. Therefore, the power supply system of the present invention has simply architecture and can reduce the cost.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power supply system, comprising:
a first power module swappable to be plugged into said power supply system for converting electric energy of a first power source into a first voltage and outputting said first voltage from a first positive output terminal and a first negative output terminal, wherein said first power module comprises a first power converting circuit for outputting said first voltage, a first switch element electrically connected between said first power converting circuit and said first positive output terminal, and a second switch element electrically connected between said first power converting circuit and said first negative output terminal and electrically connected with a ground terminal; and
a second power module swappable to be plugged into said power supply system for converting electric energy of a second power source into a second voltage and outputting said second voltage from a second positive output terminal and a second negative output terminal, wherein said second positive output terminal is electrically connected with said first positive output terminal, and said second negative output terminal is electrically connected with said first negative output terminal and said ground terminal, wherein said second power module comprises a second power converting circuit for outputting said second voltage, a third switch element electrically connected between said second power converting circuit and said second positive output terminal, and a fourth switch element electrically connected between said second power converting circuit and said second negative output terminal,
wherein said first power source and said second power source are electrically connected with each other through a center line, wherein when said first power module is in a working state in said power supply system and said second power module is then plugged into said power supply system in a hot-swappable manner, only if a phase difference or a voltage difference between said first power source and said second power source is lower than a threshold value, said second switch element and said fourth switch element are controlled to be turned on, wherein after said second switch element and said fourth switch element are turned on, if said second voltage is higher than said first voltage, said third switch element is controlled to be turned on.

2. The power supply system according to claim 1, wherein said power supply system is installed in an electronic apparatus and electrically connected with a main circuit of said electronic apparatus for driving said main circuit.

3. The power supply system according to claim 1, wherein said first power source and said second power source are two phases of a multi-phase power source, respectively.

4. The power supply system according to claim 1, wherein when said first power module is in said working state in said power supply system and said second power module is then plugged into said power supply system in said hot-swappable manner, if said phase difference or said voltage difference between said first power source and said second power source is higher than said threshold value, said second switch element and said fourth switch element are controlled to be turned off, wherein after said second switch element and said fourth switch element are turned off, if said second voltage is lower than said first voltage, said third switch element is controlled to be turned off.

5. The power supply system according to claim 1, wherein each of said first switch element, said second switch element, said third switch element and said fourth switch element is a n-type power MOSFET, a power JFET or a back-to-back n-type power MOSFET.

6. The power supply system according to claim 1, wherein said first power module further comprises a first controlling unit, wherein said first controlling unit is electrically connected with said first power source and a control terminal of said second switch element, and said first controlling unit comprises a first detecting circuit for detecting a phase or a voltage of said first power source, wherein said second power module further comprises a second controlling unit, wherein said second controlling unit is electrically connected with said second power source and a control terminal of said fourth switch element, and said second controlling unit comprises a second detecting circuit for detecting a phase or a voltage of said second power source, wherein said first detecting circuit and said second detecting circuit are in communication with each other, wherein according to detecting results of said first detecting circuit and said second detecting circuit, said first controlling unit and said second controlling unit realize whether said phase difference or said voltage difference between said first power source and said second power source is lower than said threshold value, thereby controlling operations of said second switch element and said fourth switch element.

7. The power supply system according to claim 1, wherein said second power module further comprises a comparing circuit, wherein said comparing circuit is connected with a first end and a second end of said third switch element and electrically connected with a control terminal of said third switch element for detecting whether said second voltage at a first end of said third switch element is larger than said first voltage at said second end of said third switch element, thereby controlling operations of said third switch element.

8. The power supply system according to claim 1, wherein after said first power module and said second power module are plugged into said power supply system, said first power module and said second power module are electrically connected with each other in parallel.

9. The power supply system according to claim 1, wherein said first power converting circuit is a first power factor correction circuit, and said second power converting circuit is a second power factor correction circuit.

10. A control method for a power supply system, said power supply system comprising a first power module and a second power module, wherein said first power module is swappable to be plugged into said power supply system for converting electric energy of a first power source into a first voltage and outputting said first voltage from a first positive output terminal and a first negative output terminal, wherein said first power module comprises a first power converting circuit for outputting said first voltage, a first switch element electrically connected between said first power converting circuit and said first positive output terminal and a second switch element electrically connected between said first power converting circuit and said first negative output terminal and electrically connected with a ground terminal, wherein said second power module is swappable to be plugged into said power supply system for converting electric energy of a second power source into a second voltage and outputting said second voltage from a second positive output terminal and a second negative output terminal, wherein said second positive output terminal is electrically connected with said first positive output terminal, and said second negative output terminal is electrically connected with said first negative output terminal and said ground terminal, wherein said second power module comprises a second power converting circuit for outputting said second voltage, a third switch element electrically connected between said second power converting circuit and said second positive output terminal, and a fourth switch element electrically connected between said second power converting circuit and said second negative output terminal, wherein said first power source and said second power source are electrically connected with each other through a center line, wherein said control method comprising steps of:
(a) when said first power module is in a working state in said power supply system and said second power module is then plugged into said power supply system in a hot-swappable manner, judging whether a phase difference or a voltage difference between said first power source and said second power source is lower than a threshold value;
(b) if said phase difference or said voltage difference between said first power source and said second power source is lower than said threshold value, controlling said second switch element and said fourth switch element to be turned on;
(c) judging whether said second voltage is larger than said first voltage; and
(d) if said second voltage is larger than said first voltage, controlling said third switch element to be turned on.

11. The control method according to claim 10, wherein if said phase difference or said voltage difference between said first power source and said second power source is not lower than said threshold value, said control method further comprises a step of controlling said second switch element and said fourth switch element to be turned off.

12. The control method according to claim 10, wherein if said second voltage is not larger than said first voltage, said control method further comprises a step of controlling said third switch element to be turned off.

13. The control method according to claim 10, wherein when said step (a) is performed, said first switch element is controlled to be continuously turned on.

14. The control method according to claim 10, wherein said first power converting circuit is a first power factor correction circuit, and said second power converting circuit is a second power factor correction circuit.

* * * * *